US012326681B2

(12) United States Patent
Yamaguchi

(10) Patent No.: US 12,326,681 B2
(45) Date of Patent: Jun. 10, 2025

(54) HEATING APPARATUS, FIXING UNIT, AND IMAGE FORMING APPARATUS

(71) Applicant: Canon Kabushiki Kaisha, Tokyo (JP)

(72) Inventor: Hiroki Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/481,284

(22) Filed: Oct. 5, 2023

(65) Prior Publication Data

US 2024/0118650 A1 Apr. 11, 2024

(30) Foreign Application Priority Data

Oct. 11, 2022 (JP) ................................. 2022-162909

(51) Int. Cl.
*G03G 15/20* (2006.01)

(52) U.S. Cl.
CPC ..... *G03G 15/2064* (2013.01); *G03G 15/2017* (2013.01); *G03G 15/2053* (2013.01)

(58) Field of Classification Search
CPC ........... G03G 15/2017; G03G 15/2053; G03G 15/2064
See application file for complete search history.

(56) References Cited

U.S. PATENT DOCUMENTS

| | | | | |
|---|---|---|---|---|
| 8,755,725 | B2 | 6/2014 | Kondo et al. | |
| 9,268,274 | B2 | 2/2016 | Kondo | |
| 2008/0292374 | A1* | 11/2008 | Hiraoka | G03G 15/206 399/328 |
| 2016/0231676 | A1* | 8/2016 | Ishida | G03G 15/2053 |
| 2021/0088950 | A1* | 3/2021 | Himeno | G03G 21/1685 |

FOREIGN PATENT DOCUMENTS

| | | |
|---|---|---|
| JP | 2012-137517 A | 7/2012 |
| JP | 2014-149361 A | 8/2014 |

* cited by examiner

*Primary Examiner* — Carla J Therrien
(74) *Attorney, Agent, or Firm* — Venable LLP

(57) ABSTRACT

A heating apparatus includes a rotary member, a heater configured to heat the rotary member, and a holding unit configured to hold a first end portion, in a longitudinal direction, of the rotary member. The holding unit includes a movable member including a first surface configured to face and come into contact with an inner circumferential surface of the rotary member, and a second surface configured to face and come into contact with an end face, in the longitudinal direction, of the rotary member, the first surface and the second surface are integrally provided in the movable member, and a holding member configured to hold tiltably around a tilting fulcrum. The tilting fulcrum is positioned between an upstream end and a downstream end of the first surface in the sheet conveyance direction.

11 Claims, 12 Drawing Sheets

HEATING APPARATUS, FIXING UNIT, AND IMAGE FORMING APPARATUS

BACKGROUND OF THE INVENTION

Field of the Invention

This disclosure relates to a heating apparatus that heats a toner image formed on a sheet, and a fixing unit and an image forming apparatus including this.

Description of the Related Art

According to Japanese Patent Laid-Open Nos. 2012-137517 and 2014-149361, fixing units which include a fixing film heated by a halogen lamp and a press roller forming nip with the fixing film, and which thermally fixes a toner image transferred onto a sheet in a nip portion are proposed. Guide members are disposed at both end portions in a longitudinal direction of the fixing film described in Japanese Patent Laid-Open No. 2012-137517, and the guide members include inner surface guide members guiding the rotation of the fixing film and regulation members regulating a movement of the fixing film in a lateral direction. The regulation members are secured in a tiltable manner to the inner surface guide members. Gaps are disposed between the inner surface guide members and the regulation members so as to allow the regulation members to tilt.

However, since, in the guide members described in Japanese Patent Laid-Open No. 2012-137517 described above, only the regulation members can tilt with respect to the inner surface guide members, there are following difficulties. That is, when the fixing film is pressed to the regulation member in a state in which the press roller is inclined with respect to an axial direction, the regulation member tilts with respect to the inner surface guide member. Then, since there is a portion in which the gap between the regulation member and the inner surface guide member is expanded significantly, due to the entrance of an end portion of the fixing film into the expanded gap portion, there is a possibility of causing the deformation of the fixing film.

Further, since the inner surface guide member does not move even in a state in which the fixing film and the regulation member are inclined with respect to the axis direction of the press roller, due to the interference of the inner surface guide member with the fixing film, there is a possibility of causing the wear of the fixing film.

SUMMARY OF THE INVENTION

According to one aspect of the present invention, a heating apparatus heating a toner image formed on a sheet includes a rotary member configured to rotate while coming into contact with the sheet conveyed in a sheet conveyance direction, the rotary member having flexibility and being formed into a tubular shape, a heater configured to heat the rotary member, and a holding unit configured to hold a first end portion, in a longitudinal direction, of the rotary member. The holding unit includes a movable member including a first surface configured to face and come into contact with an inner circumferential surface of the rotary member, and a second surface configured to face and come into contact with an end face, in the longitudinal direction, of the rotary member, the first surface and the second surface are integrally provided in the movable member, and a holding member configured to hold tiltably around a tilting fulcrum.

The tilting fulcrum is positioned between an upstream end and a downstream end of the first surface in the sheet conveyance direction.

Further features of the present invention will become apparent from the following description of exemplary embodiments with reference to the attached drawings.

DESCRIPTION OF THE EMBODIMENTS

First Embodiment

Overall Configuration of Image Forming Apparatus

Figure 1:
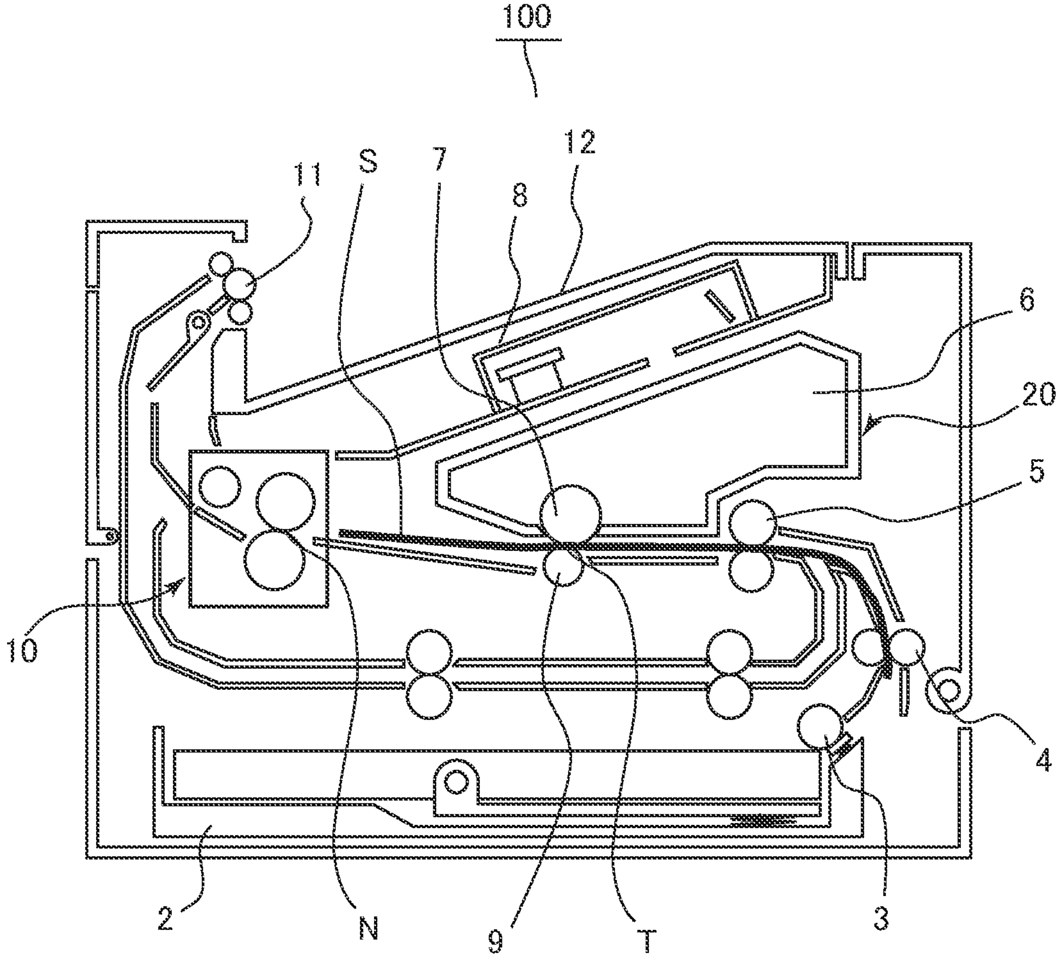
FIG. 1 is an overall schematic diagram illustrating an image forming apparatus of a first embodiment.

First, a first embodiment of this disclosure will be described. FIG. 1 is a schematic diagram illustrating an image forming apparatus 100. The image forming apparatus 100 of the first embodiment is a laser beam printer of an electrophotographic system. As illustrated in FIG. 1, the image forming apparatus 100 includes a feed cassette 2 and a sheet feed unit 3. The feed cassette 2 is disposed in manners of insertable into and drawable from an apparatus body 1. Further, the image forming apparatus 100 includes an image forming unit 20, forming an image (toner image) on a sheet S fed by the sheet feed unit 3, a fixing unit 10, and a sheet discharge roller pair 11. To be noted, in the present embodiment, the sheet S includes paper such as stationery and an envelope, a plastic film such as a sheet for an overhead projector (OHP), and cloth.

When an instruction of image formation is output to the image forming apparatus 100, based on image information input from an external computer connected to the image forming apparatus 100 or an image reading apparatus connected as an option, an image forming process by the image forming unit 20 is started. The image forming unit 20 includes a process cartridge 6, incorporating such as a photosensitive drum 7, a charge unit, and a developing roller, a scanner unit 8, and a transfer roller 9.

The scanner unit 8 irradiates the photosensitive drum 7*a* with a laser beam based on the input image information. At this time, the photosensitive drum 7 has been charged beforehand by the charge unit, and an electrostatic latent image is formed on the photosensitive drum 7 by the irradiation with the laser beam. Thereafter, the developing roller develops this electrostatic latent image, and the toner image is formed on the photosensitive drum 7.

In parallel with the image forming process described above, the sheet S stacked in the feed cassette 2 is sent out by the sheet feed unit 3. The sheet feed unit 3 is, for example, constituted from a feed roller, for feeding the sheet S stacked in the feed cassette 2, and a separation pad. To be noted, the sheet feed unit 3 is not limited to such a configuration described above, and it is acceptable to be constituted from such as, for example, a feed roller, a conveyance roller, and a separation roller. The sheet S fed by the sheet feed unit 3 is conveyed to a registration roller pair 5 by a conveyance roller pair 4, and, by abutting against a nip of the registration roller pair 5, which is in a stopped state, so as to align a leading edge of the sheet S with this nip, skew is corrected.

In a timing synchronizing with a timing of the image formation by the image forming unit 20, the sheet S whose skew has been corrected is conveyed by the registration roller pair 5 toward a transfer nip T formed by the photosensitive drum 7 and the transfer roller 9. In the transfer nip T, by applying a transfer bias to the transfer roller 9, the toner image formed on the photosensitive drum 7 is transferred onto the sheet S. The sheet S onto which the toner image has been transferred by the transfer nip T is processed under heat and pressure by the fixing unit 10, and the toner image is fixed. Then, the sheet S on which the toner image has been fixed is discharged to a sheet discharge tray 12 by the sheet discharge roller pair 11.

Configuration of Fixing Unit

Figure 2:
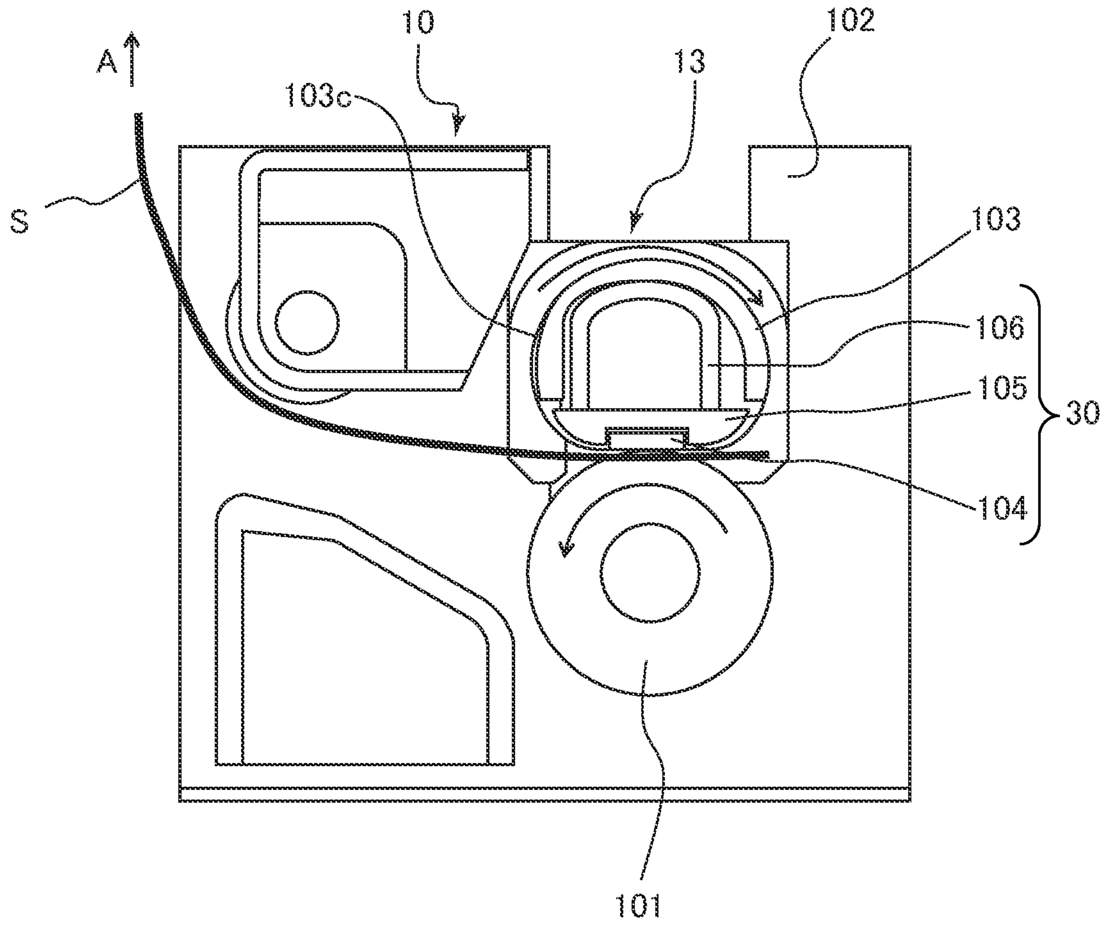
FIG. 2 is a cross-sectional view illustrating a fixing unit.
Figure 3A:
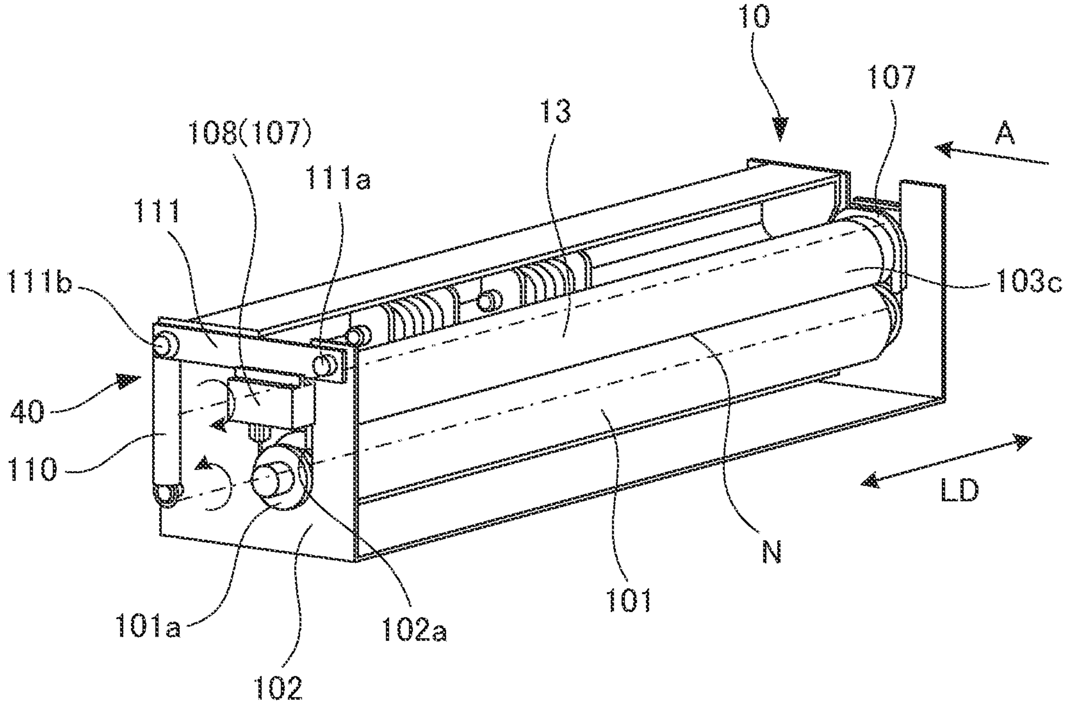
FIG. 3A is a perspective view illustrating the fixing unit.
Figure 3B:
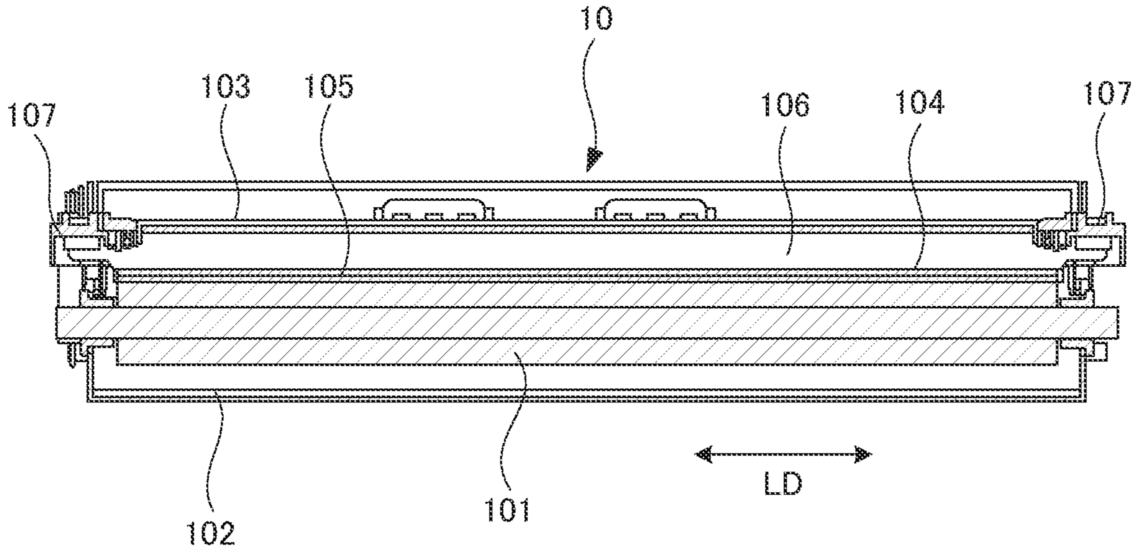
FIG. 3B is a cross-sectional view illustrating the fixing unit when viewed from an upstream side in a sheet conveyance direction.

Next, using FIGS. 2 to 3B, a configuration of the fixing unit 10 will be described. FIG. 2 is a cross-sectional view illustrating the fixing unit 10. FIG. 3A is a perspective view illustrating the fixing unit 10, and FIG. 3B is a cross-sectional view illustrating the fixing unit 10 when viewed from an upstream side in a sheet conveyance direction. As illustrated in FIG. 2, the fixing unit 10 includes such as a heating unit 13, a press roller 101, and a frame 102.

The heating unit 13, serving as a heating apparatus, includes a film 103 that has flexibility and is formed into a tubular shape, a heater 104 that comes into contact with an inner surface of the film 103 and heats the film 103, a heater holder 105 that holds the heater 104, and a stay 106. The film 103, serving as a rotary member, rotates while coming into contact with the sheet S that is conveyed in the sheet conveyance direction A. The stay 106 maintains the stiffness of the heating unit 13. The heater 104, the heater holder 105, and the stay 106 construct a backup unit 30 that comes into contact with the inner surface of the film 103 over the whole length in a longitudinal direction of the film 103.

To be noted, various types of heaters, such as a halogen heater, a ceramic heater, and an induction heating (IH) heater can be applied to the heater 104. Further, in a case of applying the IH heater to the heater 104, the film 103 includes a heating layer of magnetic metal. Further, in place of the film 103, it is acceptable to use an endless belt that has the flexibility.

The press roller 101 includes a metallic core metal and a rubber layer, and comes into contact with an outer circumferential surface 103*c* of the film 103. The press roller 101 forms a fixing nip portion N with the backup unit 30 via the film 103 for nipping and conveying the sheet S. Further, the press roller 101 is driven by a motor, not shown, via a gear. When the press roller 101 rotates, the film 103 rotates in a manner that follows the rotation of the press roller 101.

Figure 5:
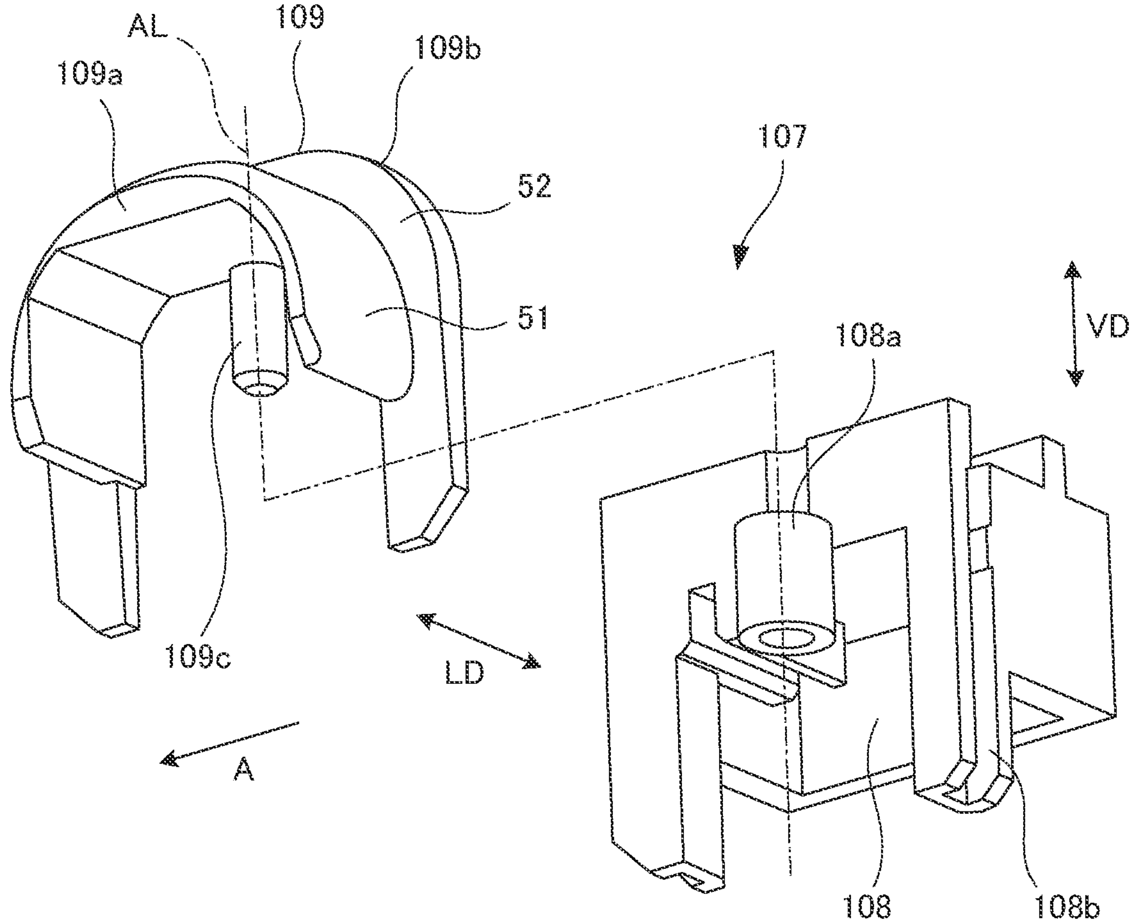
FIG. 5 is an exploded perspective view illustrating the flange.

As illustrated in FIG. 3A, two U-shaped concave portions 102*a* for installing bearings 101*a* of the press roller 101 are disposed in the frame 102 of the fixing unit 10. The two bearings 101*a* disposed at shaft end portions of the press roller 101 are held by these concave portions 102*a*. Further, both end portions of the backup unit 30 are supported by the frame 102 via two flanges 107, and each of the flanges 107 includes, as illustrated in FIG. 5, a holding member 108 and a movable member 109. A groove portion 108*b* is disposed in the holding member 108, and, by the engagement of the groove portion 108*b* with the U-shaped concave portion 102*a*, the heating unit 13 is held by the frame 102 via the flange 107.

As illustrated in FIG. 3A, a pressing mechanism 40 is disposed on an upper surface of the holding member 108, and the pressing mechanism 40 includes a pressing spring 110 and a pressing plate 111. The pressing plate 111 is pivotably supported by the frame 102 around a pivot shaft 111*a* disposed in an end portion in the longitudinal direction of the pressing plate 111. The pressing spring 110 is stretched between an end portion 111*b* opposite to the pivot shaft 111*a* of the pressing plate 111 and the frame 102, and the pressing plate 111 presses the holding member 108 downward by an urging force of the pressing spring 110.

Then, by pressing the holding member 108 downward, the heater 104 is urged toward the press roller 101 via the movable member 109 supported by the holding member 108, the stay 106, and the heater holder 105. Thereby, the rubber layer of the press roller 101 is compressed, and the backup unit 30 and the press roller 101 form the fixing nip portion N via the film 103. In other words, by urging the holding member 108 toward the press roller 101, the pressing mechanism 40 brings the film 103 into pressure contact with the press roller 101.

The sheet S that bears the toner image is, while coming into contact with the film 103, nipped and conveyed in the fixing nip portion N. During this period, the toner image is heated by the heater 104 via the film 103, and fixed on the sheet S.

As illustrated in FIG. 3B, the heater 104 has a shape elongated in the longitudinal directions LD of the fixing unit 10 and the film 103. The heater 104 is the ceramic heater with a heating resistor printed on a ceramic board, and electric power is supplied via a power supply connector. A temperature of the heater 104 is monitored by a temperature detection element, not shown, and the heater 104 is power controlled such that a detected temperature of the temperature detection element maintains a target temperature. The heater holder 105 is made by molding a heat resistance resin such as liquid crystal plastic (LCP) and poly phenylene sulfide resin (PPS). A groove for fitting the heater 104 is disposed in the heater holder 105, and, by fitting the heater 104 into this groove, the heater 104 is held across the longitudinal direction LD. The stay 106 has a U-shaped cross section, and is made of metal. With respect to the heater holder 105, the stay 106 comes into contact across the longitudinal direction LD, and reinforces the heater holder 105.

Configuration of Flange

Figure 4A:
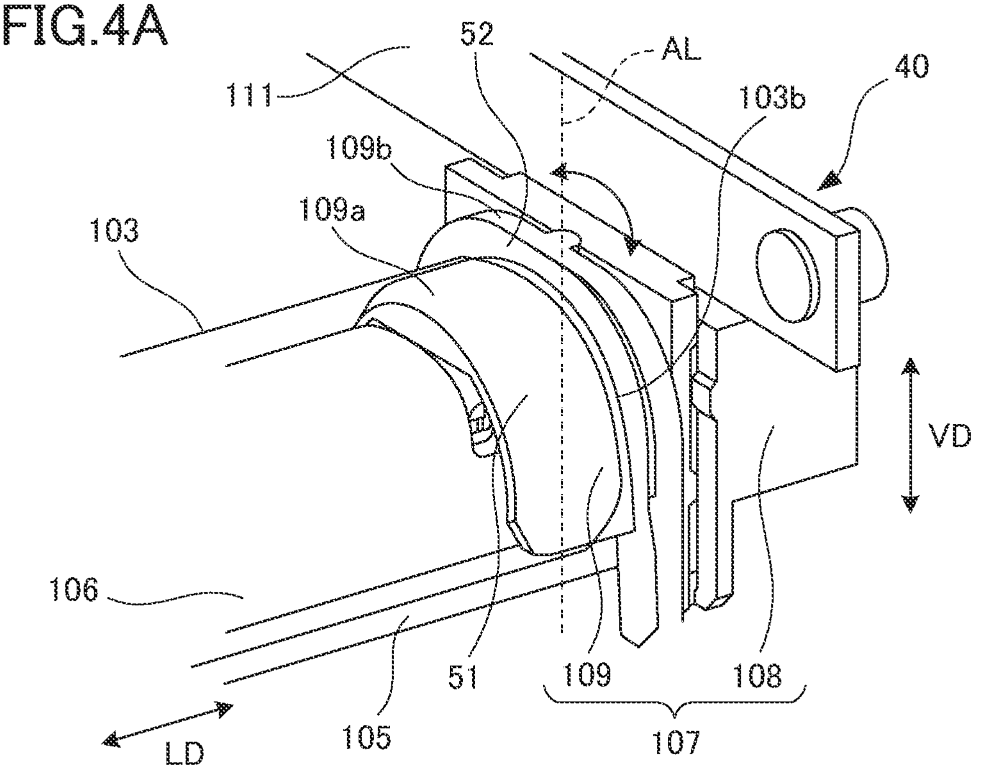
FIG. 4A is a perspective view illustrating a flange.
Figure 4B:
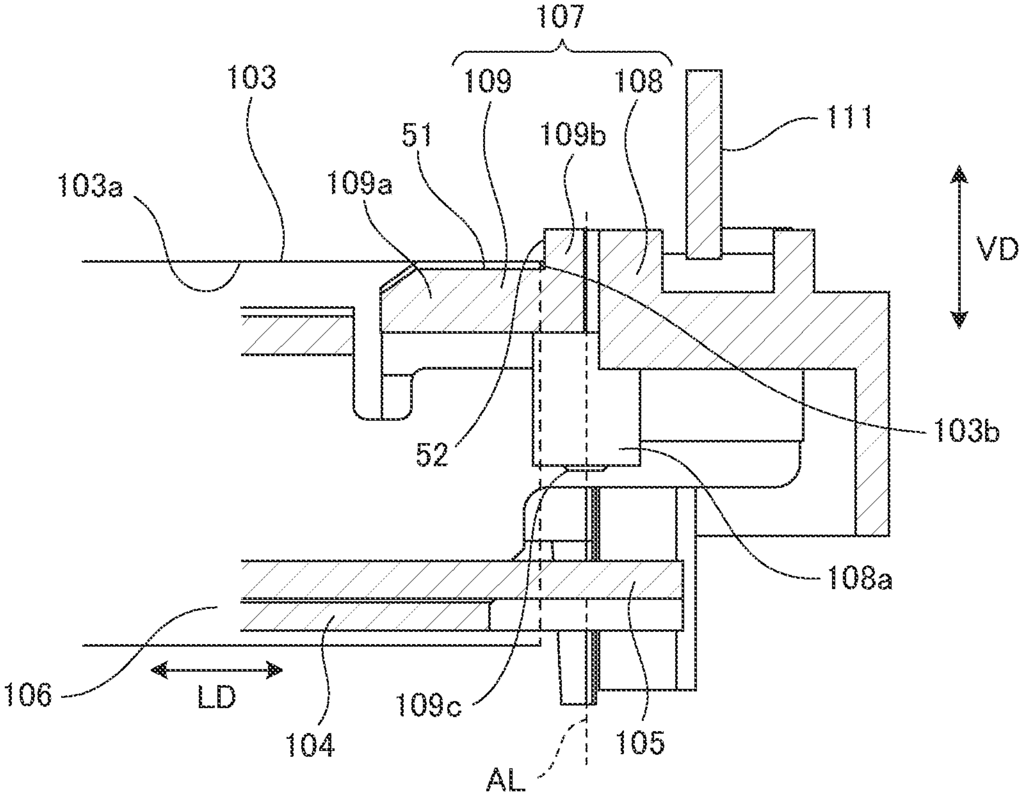
FIG. 4B is a cross-sectional view illustrating the flange when viewed from the upstream side in the sheet conveyance direction.

Next, using FIGS. 4A to 5, a configuration of the flange 107 will be described in detail. FIG. 4A is a perspective view illustrating the flange 107, and FIG. 4B is a cross-sectional view illustrating the flange 107 when viewed from the upstream side in the sheet conveyance direction A. FIG. 5 is an exploded perspective view illustrating the flange 107.

As illustrated in FIGS. 4A to 5, the flange 107, serving as a holding unit, holds a first end portion in the longitudinal direction LD of the film 103, and includes the holding member 108 and the movable member 109. The movable member 109 is tiltably supported with respect to the holding member 108, and the holding member 108, while being supported by the frame 102, supports the heater holder 105 and the stay 106.

The movable member 109 includes an inner surface receiving portion 109*a* formed into a semi-tubular shape, an end face receiving portion 109*b* disposed outside of the inner surface receiving portion 109*a* and the film 103 in the longitudinal direction LD, and a shaft portion 109*c* projecting downward from a lower surface of the inner surface receiving portion 109*a*. The inner surface receiving portion 109*a* includes a first surface 51 configured to face and come into contact with an inner circumferential surface 103*a* of the film 103, and the first surface 51 is formed in a semi-circumferential surface shape along the inner circumferential surface 103*a* of the film 103. Some clearance is created between the inner circumferential surface 103*a* of the film 103 and the first surface 51 of the inner surface receiving portion 109*a*, and the first surface 51 has a function to guide the inner circumferential surface 103*a* when the film 103 rotates.

Further, the end face receiving portion 109*b* includes a second surface 52 configured to face and come into contact with an end face 103*b* in the longitudinal direction LD of the film 103. The second surface 52 extends outward in a radial direction orthogonal to the longitudinal direction LD from the inner surface receiving portion 109*a*. When the film 103 approaches the second surface 52 in the longitudinal direction LD, the end face 103*b* of the film 103 abuts against the second surface 52, and a movement of the film 103 in the longitudinal direction LD is regulated.

Figure 6A:
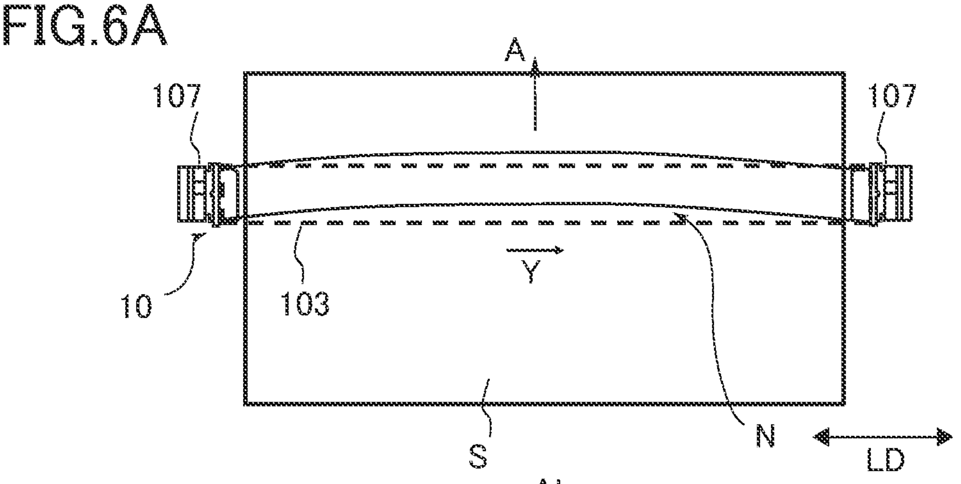
FIG. 6A is a top view illustrating a state in which a film is deformed.
Figure 6B:
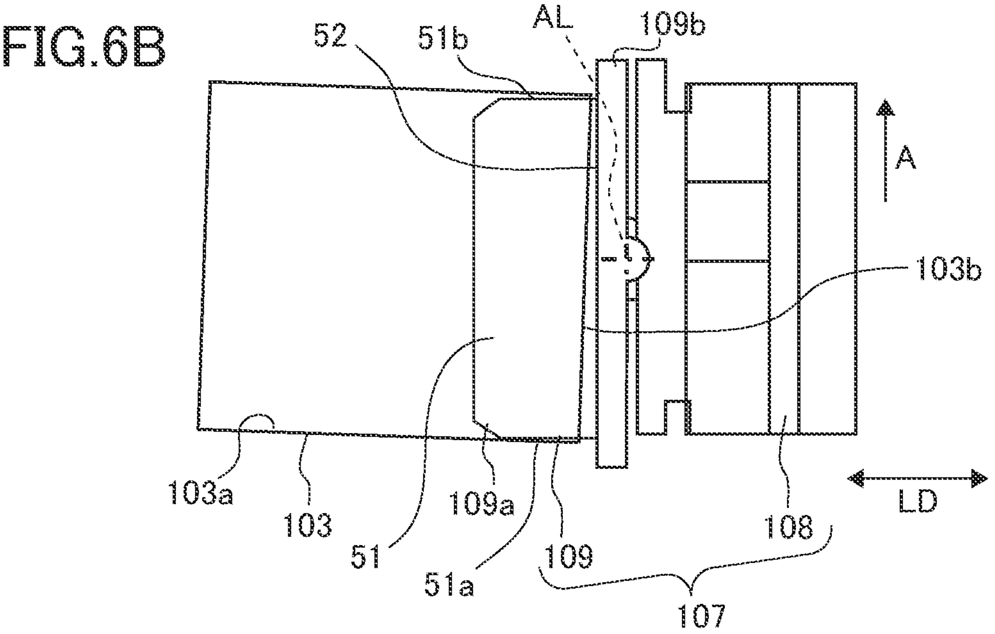
FIG. 6B is a top view illustrating the flange before a lateral force is generated.
Figure 6C:
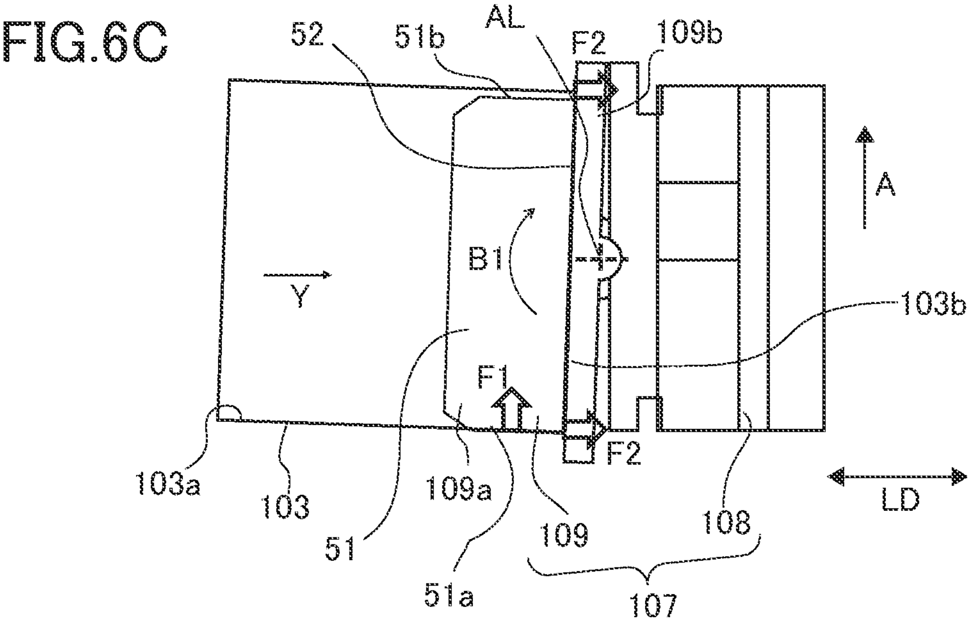
FIG. 6C is a top view illustrating a state in which the lateral force has been generated and the film abuts against a movable member of the flange.

The shaft portion 109*c* projecting downward from the lower surface of the inner surface receiving portion 109*a* is arranged substantially in a central portion of the inner surface receiving portion 109*a* in the sheet conveyance direction A. The holding member 108 includes a hole portion 108*a* into which the shaft portion 109*c* loosely fits, and, by the engagement of the shaft portion 109*c* with the hole portion 108*a*, the movable member 109 is tiltably supported with respect to the holding member 108. In particular, as illustrated in FIGS. 4A and 4B, the movable member 109 tilts around an axis AL. The axis AL passes through the centers of the shaft portion 109*c* and the hole portion 108*a*, and extends in a vertical direction VD, serving as an orthogonal direction orthogonal to the longitudinal direction LD and the sheet conveyance direction A. That is, the axis AL is a tilting fulcrum of the movable member 109. In the present embodiment, as illustrated in FIGS. 6B and 6C, the axis AL is positioned between an upstream end 51*a* and a downstream end 51*b* of the first surface 51 in the sheet conveyance direction A, and is positioned farther from the film 103 than the second surface 52 in the longitudinal direction LD.

Movement of Movable Member

Next, using FIGS. 6A to 6C, a movement of the movable member 109 at a time when the film 103 abuts against the end face receiving portion 109*b* of the movable member 109 by a lateral force will be described. To be noted, hereinafter, the lateral force refers to a force that is exerted to the film 103 so as to cause the film 103 to approach one side in the longitudinal direction LD (axial direction). FIG. 6A is a top view illustrating a state in which the film 103 is deformed, and FIG. 6B is a top view illustrating the flange 107 before the lateral force is generated. FIG. 6C is a top view illustrating a state in which the lateral force has been generated and the film 103 abuts against the movable member 109 of the flange 107.

As illustrated in FIG. 6A, during a time when the sheet S passes through the fixing unit 10, there is a case where the film 103 is deformed such that its central portion in the longitudinal direction LD protrudes downstream in the sheet conveyance direction A due to a conveyance force of the sheet by the fixing nip portion N. In such a state, consider a case where the film 103 has approached toward the movable member 109, that is, in an arrow Y direction, due to factors such as, for example, misalignment between the press roller 101 and the film 103. That is, consider a case where the lateral force is exerted to the film 103 that has been deformed as illustrated in FIG. 6A.

In such a case, as illustrated in FIG. 6B, while being slightly tilted with respect to a thrust direction of the heater holder 105, the end face 103*b* of the film 103 comes into contact with the second surface 52 of the end face receiving portion 109*b* of the movable member 109. As illustrated in FIG. 6C, in the fixing nip portion N, the film 103 is rotatably driven with respect to the press roller 101, and the upstream side in the sheet conveyance direction A of the film 103 is pulled toward the fixing nip portion N. Further, the movable member 109 is arranged with respect to the film 103 such that a gap on the upstream side in the sheet conveyance direction A becomes narrower than a gap on the downstream side. Therefore, to the inner surface receiving portion 109*a* of the movable member 109, a force F1 is exerted from the inner circumferential surface 103*a* of the film 103 in the downstream direction of the sheet conveyance direction A. At the same time, to the end face receiving portion 109*b*, a force F2 (lateral force) is exerted from the end face 103*b* of the film 103.

In the movable member 109 that comes into contact with the inner circumferential surface 103*a* and the end face 103*b* of the film 103, the forces F1 and F2 are exerted from the film 103 to the inner surface receiving portion 109*a* and the end face receiving portion 109*b*. Thereby, a moment in an arrow B1 direction around the axis AL is generated in the film 103, and the film 103 tilts with respect to the holding member 108 in the arrow B1 direction. That is, the movable member 109 tilts around the axis AL when at least one of the first and second surfaces 51 and 52 receives a force from the film 103.

Consequently, the movable member 109 assumes a tilted posture following the inner circumferential surface 103*a* and the end face 103*b* of the film 103. Therefore, the end face 103*b* of the film 103 that has tilted comes into contact with the second surface 52 of the end face receiving portion 109*b* of the movable member 109 in a balanced manner on both the upstream and downstream sides in the sheet conveyance direction A.

As described above, even if the film 103 comes into contact with the second surface 52 of the end face receiving portion 109*b* with the film 103 tilted with respect to the longitudinal direction LD and the sheet conveyance direction A, since the movable member 109 tilts, it is possible to reduce stress concentration onto the end face 103*b* of the film 103. Thereby, it is possible to suppress the wear and the deformation of the film 103.

Second Embodiment

While, next, a second embodiment of the present disclosure will be described, in the second embodiment, the configuration of the flange of the first embodiment is changed. Therefore, configurations similar to the first embodiment will be described by omitting illustrations or by putting the same reference characters on drawings herein.

Configuration of Flange

Figure 7:
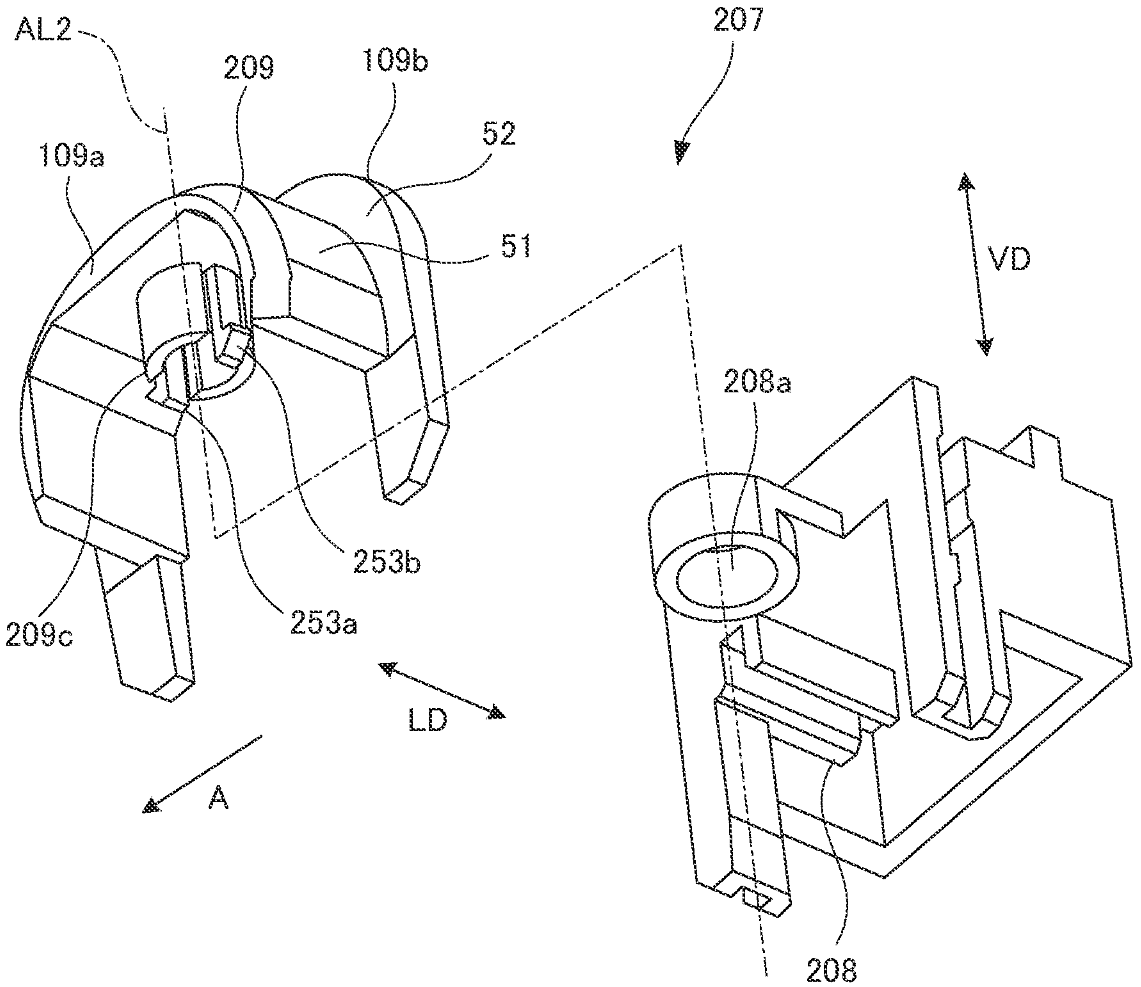
FIG. 7 is an exploded perspective view illustrating a flange of a second embodiment.

First, using FIG. 7, a configuration of a flange 207 of the second embodiment will be described in detail. To be noted, in the second embodiment, configurations are similar to the configurations of the first embodiment except that the flange 107 of the first embodiment is replaced with the flange 207. FIG. 7 is an exploded perspective view illustrating the flange 207.

As illustrated in FIG. 7, the flange 207 holds the first end portion in the longitudinal direction LD of the film 103, and includes a holding member 208 and a movable member 209. The movable member 209 is tiltably supported with respect to the holding member 208, and the holding member 208, while being supported by the frame 102 (refer to FIG. 3A), supports the heater holder 105 and the stay 106.

Similar to the first embodiment, the movable member 209 includes the inner surface receiving portion 109*a* including the first surface 51 and the end face receiving portion 109*b* including the second surface 52. On the other hand, the movable member 209 includes a shaft portion 209*c* that is different from the shaft portion 109*c* of the first embodiment. The shaft portion 209*c* projects downward from the lower surface of the inner surface receiving portion 109*a*, and is arranged substantially in the central portion of the inner surface receiving portion 109*a*. The inner surface receiving portion 109*a*, the end face receiving portion 109*b*, and the shaft portion 209*c* described above are provided integrally with each other. In other words, the first surface 51 of the inner surface receiving portion 109*a* and the second surface 52 of the end face receiving portion 109*b* are provided integrally with each other.

The holding member 208 includes a hole portion 208*a* into which the shaft portion 209*c* loosely fits, and, by the engagement of the shaft portion 209*c* with the hole portion 208*a*, the movable member 209 is tiltably supported with respect to the holding member 208. In particular, the movable member 209 tilts around an axis AL2. The axis AL2 passes through the centers of the shaft portion 209*c* and the hole portion 208*a*, and extends in the vertical direction VD, serving as the orthogonal direction orthogonal to the longitudinal direction LD and the sheet conveyance direction A. That is, the axis AL2 is a tilting fulcrum of the movable member 209.

Figure 10A:
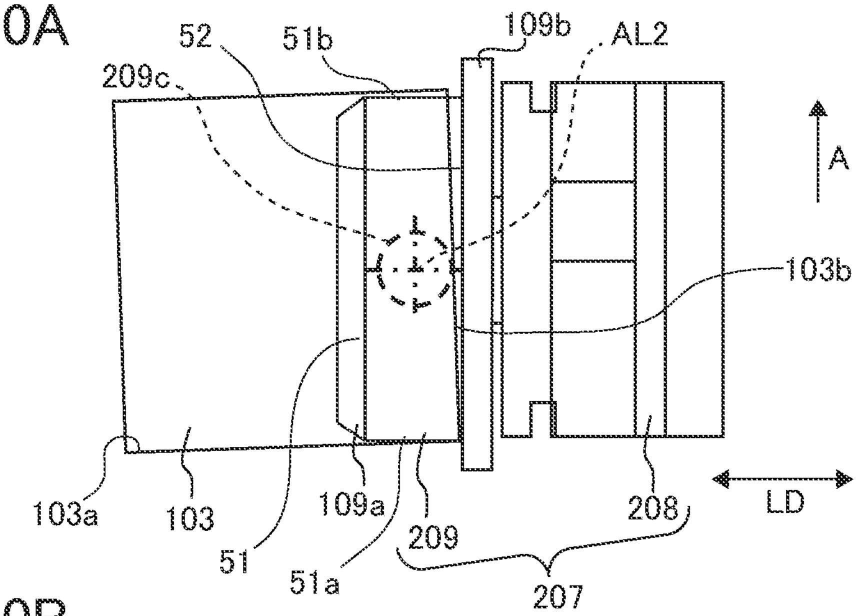
FIG. 10A is a top view illustrating the flange of the second embodiment before the lateral force is generated.

In the present embodiment, as illustrated in FIG. 10A, the axis AL2 is positioned between the upstream and downstream ends 51*a* and 51*b* of the first surface 51 in the sheet conveyance direction A, and is positioned in a closer position with respect to the film 103 in the longitudinal direction LD than the second surface 52. In other words, when viewed in the vertical direction VD (refer to FIG. 7) orthogonal to the longitudinal direction LD and the sheet conveyance direction A, the axis AL2, serving as the tilting fulcrum, is positioned so as to overlap the first surface 51.

Further, as illustrated in FIG. 7, two claw portions 253*a* and 253*b* that are elastically deformable are disposed in the shaft portion 209*c*. When the shaft portion 209*c* of the movable member 209 is inserted into the hole portion 208*a* of the holding member 208, after having passed through the hole portion 208*a*, the claw portions 253*a* and 253*b* engage with an edge portion of the hole portion 208*a*. Thereby, the shaft portion 209*c* is prevented from disengaging from the hole portion 208*a*, and can maintain an engaged state of the holding member 208 and the movable member 209. In other words, the claw portions 253*a* and 253*b*, serving as regulation portions, regulate that the movable member 209 is detached from the holding member 208. To be noted, in place of the claw portions 253*a* and 253*b*, it is acceptable to provide the hole portion 208*a* with a configuration of preventing the disengagement.

Comparative Example (First Embodiment)

Figure 8:
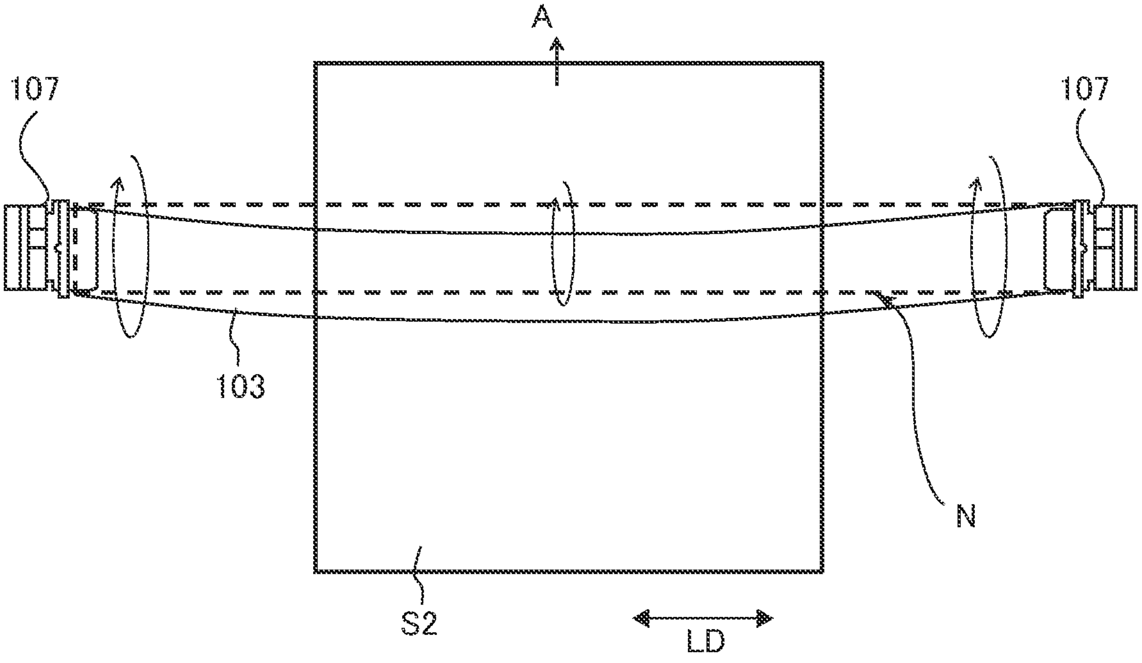
FIG. 8 is a top view illustrating a state in which the film of a comparative example is deformed.
Figure 9:
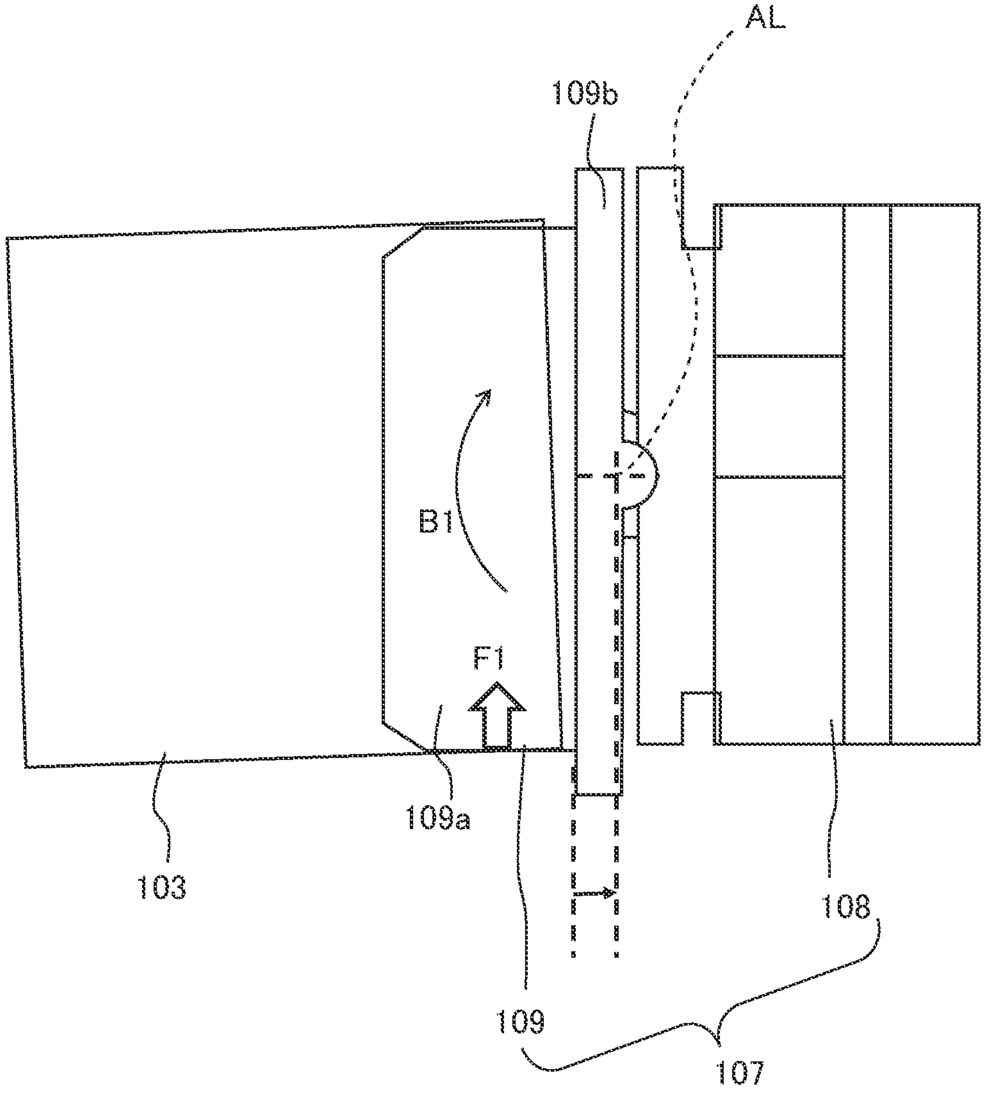
FIG. 9 is a top view illustrating a force exerted from the film of the comparative example to the movable member.

Next, using FIGS. 8 and 9, a comparative example will be described. FIG. 8 is a top view illustrating a state in which the film 103 is deformed. FIG. 9 is a top view illustrating a force exerted from the film 103 of the comparative example to the movable member 109. In this comparative example, as an example, a case of conveying a small size sheet S2 is assumed. In this case, in an area outside of a sheet conveyance area on the press roller 101, the heater 104 does not supply the heat to the sheet S2, but to the press roller 101 directly. Thereby, temperatures of end portions in the longitudinal direction LD of the press roller 101 become higher than a temperature of the sheet conveyance area of the sheet S2, and the end portions in the longitudinal direction LD of the press roller 101 thermally expand. Then, sheet conveyance speeds of the end portions in the longitudinal direction LD of the press roller 101 become faster than a sheet conveyance speed in the central portion.

Consequently, as illustrated in FIG. 8, the film 103 is deformed such that the central portion in the longitudinal direction LD protrudes upstream in the sheet conveyance direction A. In this comparative example, the flange 107 of the first embodiment is applied. In this case, as illustrated in FIG. 9, the film 103 assumes a posture that is inclined with respect to the thrust direction of the heater holder 105. The axis AL that is the tilting fulcrum of the movable member 109 is positioned further outside in the longitudinal direction LD than the first surface 51 of the inner surface receiving portion 109*a*. In other words, the axis AL is positioned farther from the film 103 than the second surface 52 in the longitudinal direction LD.

Then, while the force F1 described above is exerted from the film 103 to the inner surface receiving portion 109*a*, since the axis AL is positioned as described above, a moment around the axis AL by the force F1 is applied in the arrow B1 direction. That is, a moment in a direction that does not follow an inclination of the film 103 is applied to the movable member 109.

Movement of Movable Member

Figure 10B:
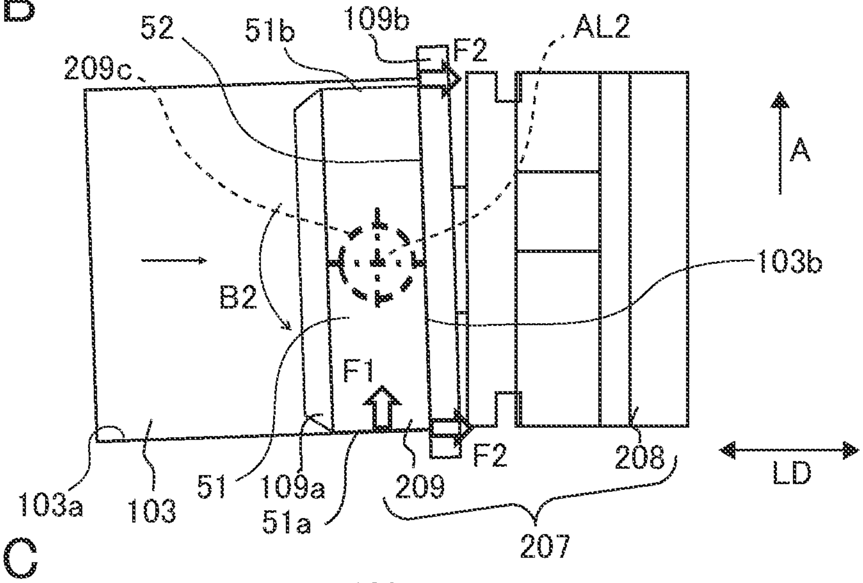
FIG. 10B is a top view illustrating a state in which the lateral force has been generated and the film that has tilted in one direction abuts against the movable member of the flange.
Figure 10C:
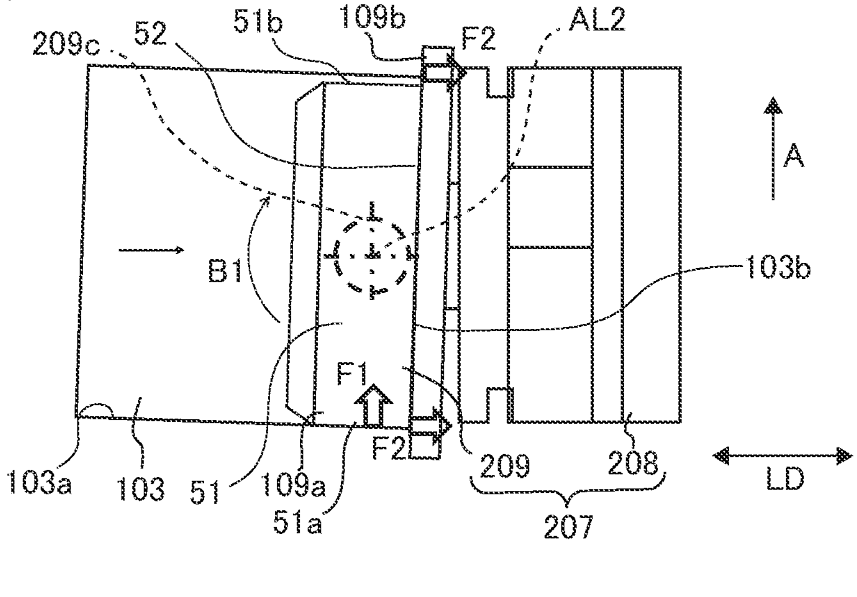
FIG. 10C is a top view illustrating a state in which the lateral force has been generated and the film that has tilted in the other direction abuts against the movable member of the flange.

Therefore, in the present embodiment, the axis AL2 is positioned in a position illustrated in FIGS. 10A to 10C. Using FIGS. 10A to 10C, a movement of the movable member 209 at a time when the film 103 has abutted against the end face receiving portion 109b of the movable member 109 by the lateral force will be described. FIG. 10A is a top view illustrating the flange 207 before the lateral force is generated. FIG. 10B is a top view illustrating a state in which the lateral force has been generated and the film 103 that has tilted in one direction abuts against the movable member 209 of the flange 207. FIG. 10C is a top view illustrating a state in which the lateral force has been generated and the film 103 that has tilted in the other direction abuts against the movable member 209 of the flange 207.

When the axis AL2 is positioned as illustrated in FIG. 10A, it becomes difficult for the force F1, described above, exerted from the film 103 to the inner surface receiving portion 109a, to act as a moment that rotates the movable member 209 around the axis AL2. This is because, when viewed in a direction of the axis AL2 (vertical direction VD), the force F1 possesses a vector directed toward the axis AL2. That is, a moment generated in the movable member 209 when the lateral force is exerted to the film 103 is solely attributable to the force F2 (lateral force) that is generated when the end face 103b comes into contact with the end face receiving portion 109b.

For example, FIG. 10B illustrates the movable member 209 in a case where the lateral force is generated in the film 103 that has been deformed as illustrated in FIG. 8. For example, as illustrated in FIG. 10B, the upstream side in the sheet conveyance direction A of the end face 103b of the film 103 first comes into contact with respect to the second surface 52 of the end face receiving portion 109b. Then, a moment in an arrow B2 direction around the axis AL2 is generated in the movable member 209, and the movable member 209 rotates in the arrow B2 direction. Next, the downstream side in the sheet conveyance direction A of the end face 103b of the film 103 comes into contact with the second surface 52 of the end face receiving portion 109b. Then, a moment around the axis AL2 in a direction (arrow B1 direction) that opposes the arrow B2 direction is generated in the movable member 209.

As described above, the forces F2 are exerted onto both the upstream and downstream sides in the sheet conveyance direction A of the end face receiving portion 109b, and the moments are balanced in a posture in which a difference between the forces F2 on the upstream and downstream sides is reduced, and a posture of the movable member 209 is determined. That is, the movable member 209 tilts to a posture that follows the inclination of the film 103.

On the other hand, FIG. 10C illustrates the movable member 209 in a case where the lateral force is generated in the film 103 that has been deformed as illustrated in FIG. 6A. Similar to a case described in FIG. 10B, the movable member 209 tilts to a posture that follows the inclination of the film 103.

As described above, regardless of whether the film 103 is inclined upstream or downstream in the sheet conveyance direction A, the movable member 209 assumes the posture that follows the inclination of the film 103. Therefore, it is possible to reduce the stress concentration onto the end face 103b of the film 103, and possible to suppress the wear and the deformation of the film 103.

To be noted, while, in the comparative example described above, the deformation of the film 103 is described using a case of conveying the small size sheet as an example, it is not limited to this. For example, a shape and the inclination of the film 103 can change in many ways due to such as, other than the size of a sheet that is conveyed, shapes of the heater holder 105, the press roller 101, and the fixing nip portion N, and the misalignment of the press roller 101.

Third Embodiment

While, next, a third embodiment of the present disclosure will be described, in the third embodiment, the configuration of the flange of the second embodiment is changed. Therefore, configurations similar to the second embodiment will be described by omitting illustrations or by putting the same reference characters on drawings herein.

Configuration of Flange

Figure 11:
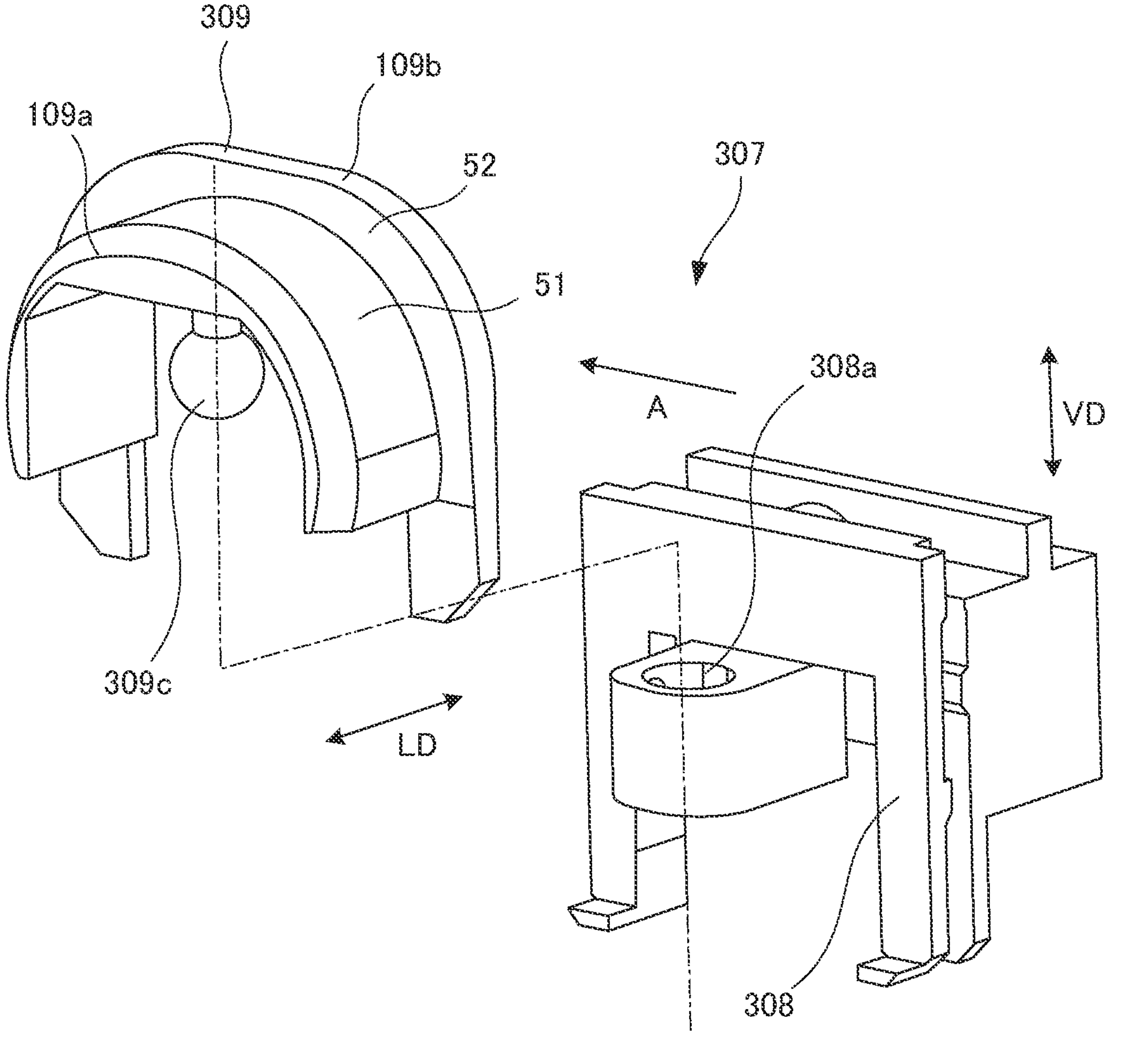
FIG. 11 is an exploded perspective view illustrating a flange of a third embodiment.
Figure 12A:
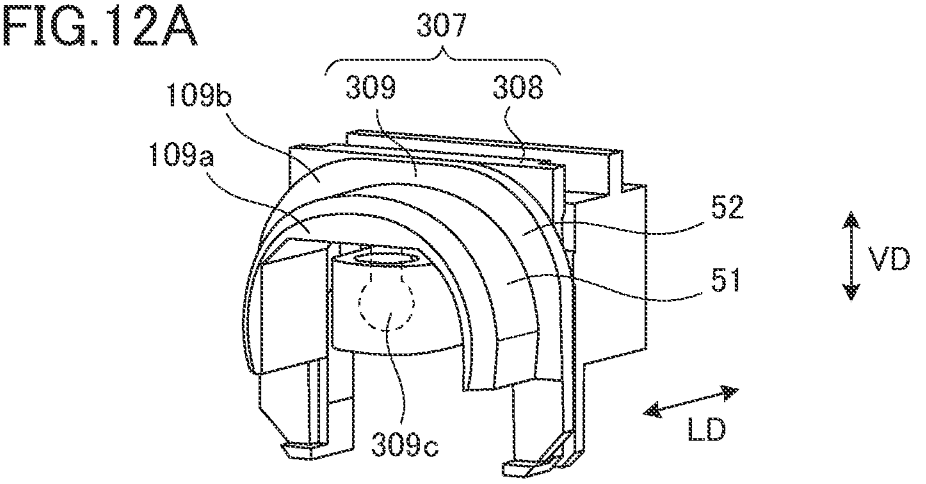
FIG. 12A is a perspective view illustrating the flange.
Figure 12B:
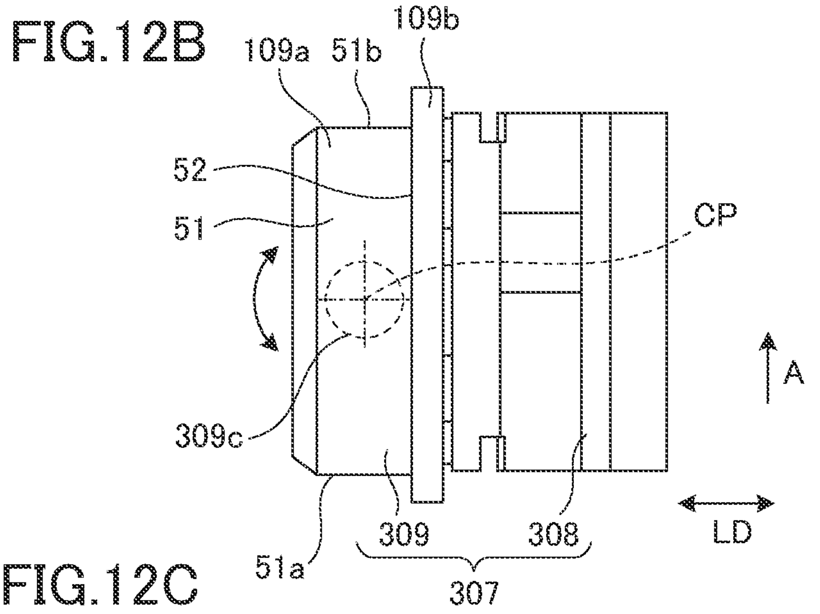
FIG. 12B is a top view illustrating the flange.
Figure 12C:
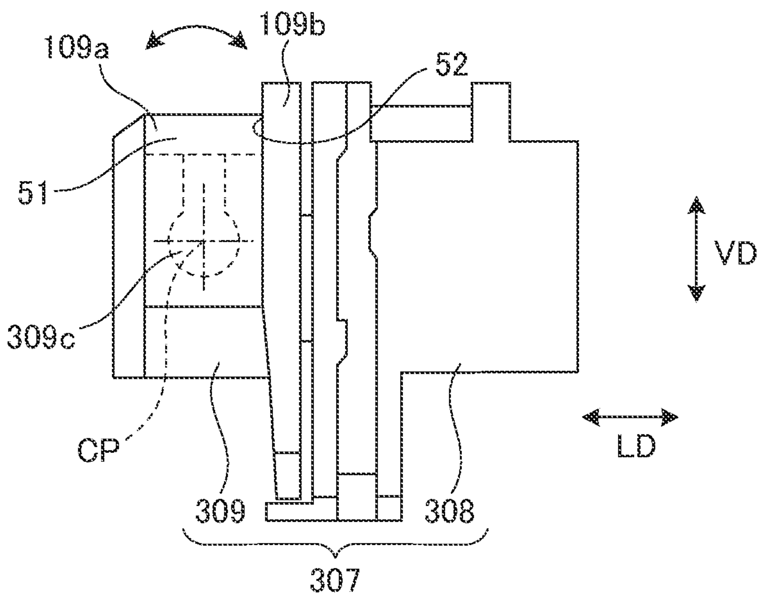
FIG. 12C is a front view illustrating the flange.

Using FIGS. 11 to 12C, a configuration of a flange 307 of the third embodiment will be described in detail. To be noted, in the third embodiment, configurations are similar to the configurations of the second embodiment except that the flange 207 of the second embodiment is replaced with the flange 307. FIG. 11 is an exploded perspective view illustrating the flange 307. FIG. 12A is a perspective view illustrating the flange 307. FIG. 12B is a top view illustrating the flange 307. FIG. 12C is a front view illustrating the flange 307.

As illustrated in FIGS. 11 to 12C, the flange 307 holds the first end portion in the longitudinal direction LD of the film 103, and includes a holding member 308 and a movable member 309. The movable member 309 is tiltably supported with respect to the holding member 308, and the holding member 308, while being supported by the frame 102 (refer to FIG. 3A), supports the heater holder 105 and the stay 106.

Similar to the second embodiment, the movable member 309 includes the inner surface receiving portion 109a including the first surface 51 and the end face receiving portion 109b including the second surface 52. On the other hand, the movable member 309 includes a spherical portion 309c that is different from the shaft portion 209c of the second embodiment. The spherical portion 309c is formed into a spherical shape, projects downward from the lower surface of the inner surface receiving portion 109a, and is arranged substantially in the central portion in the sheet conveyance direction A of the inner surface receiving portion 109a.

The holding member 308 includes a hole portion 308a, serving as an engaged portion, into which the spherical portion 309c loosely fits, and, by the engagement of the spherical portion 309c with the hole portion 308a, the movable member 309 is tiltably supported with respect to the holding member 308. In particular, as illustrated in FIGS. 12B and 12C, the movable member 309 can tilt in any direction around a center CP of the spherical portion 309c. That is, the center CP is a tilting fulcrum of the movable member 309.

In the present embodiment, as illustrated in FIG. 12B, the center CP is positioned between the upstream end 51a and the downstream end 51b in the sheet conveyance direction A of the first surface 51, and is positioned closer to the film 103 in the longitudinal direction LD than the second surface 52. In other words, when viewed in the vertical direction VD (refer to FIG. 12A) orthogonal to the longitudinal direction LD and the sheet conveyance direction A, the center CP, serving as the tilting fulcrum, is positioned so as to overlap the first surface 51. Similar to the second embodiment, the movable member 309 tilts to the posture that follows the inclination of the film 103.

Since, as described above, the movable member 309 of the present embodiment can tilt in any direction around the center CP, the movable member 309 can more correspondingly tilt along the inclination of the film 103. Therefore, when the lateral force is exerted to the film 103, regardless of the shape and the inclination of the film 103, it is possible to reduce the stress concentration onto the end surface 103*b* of the film 103, and possible to suppress the wear and the deformation of the film 103.

OTHER EMBODIMENTS

To be noted, while, in any of the embodiments described above, the fixing unit 10 conveys the sheet S in a horizontal direction, it is not limited to this. That is, while, in any of the embodiments described above, the orthogonal direction orthogonal to the sheet conveyance direction A and the longitudinal direction LD is the vertical direction, it is not limited to this. It is acceptable to freely set a conveyance path of the image forming apparatus 100, and, for example, the fixing unit 10 may convey the sheet S in the vertical direction.

While, in any of the embodiments described above, the flanges 107, 207, and 307 each are disposed in positions that oppose both ends of the film 103, it is not limited to this. For example, by predetermining a lateral movement direction of the film 103 in one direction, it is acceptable to dispose the flanges 107, 207, and 307 only on a side of the lateral movement direction of the film 103.

Further, while, in any of the embodiments described above, the backup unit 30 is configured such that the heater 104 directly comes into contact with the film 103, it is not limited to this. For example, it is acceptable to configure the backup unit 30 such that the heater 104 comes into contact with the film 103 via a sheet material, such as iron alloy and aluminum, having high thermal conductivity.

Further, in any of the embodiments described above, the press roller 101 is disposed so as to be incapable of moving with respect to the frame 102 in the vertical direction VD, and the heating unit 13 is disposed so as to be capable of moving with respect to the frame 102 via the holding member 108 in the vertical direction VD. However, it is not limited to this. For example, it is acceptable that the heating unit 13 is disposed so as to be incapable of moving with respect to the frame 102 in the vertical direction VD, and the press roller 101 is disposed so as to be capable of moving with respect to the frame 102 via the holding member 108 in the vertical direction VD. In this case, the press roller 101 is urged toward the heating unit 13 by the pressing mechanism 40.

Further, in the first and second embodiments, the shaft portions 109*c* and 209*c* are disposed in the movable members 109 and 209, and the hole portions 108*a* and 208*a* are disposed in the holding members 108 and 208. However, it is not limited to this. For example, it is acceptable that the hole portions 108*a* and 208*a* are disposed in the movable members 109 and 209, and the shaft portions 109*c* and 209*c* are disposed in the holding members 108 and 208. Similarly, in the third embodiment, the spherical portion 309*c* is disposed in the movable member 309, and the hole portion 308*a* is disposed in the holding member 308. However, it is not limited to this. For example, it is acceptable that the hole portion 308*a* is disposed in the movable members 309, and the spherical portion 309*c* is disposed in the holding member 308.

Further, in the third embodiment, it is acceptable that, similar to the first embodiment, the center CP of the spherical portion 309*c* is positioned farther from the film 103 than the second surface 52 in the longitudinal direction LD.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-162909, filed Oct. 11, 2022, which is hereby incorporated by reference herein in its entirety.

What is claimed is:

1. A heating apparatus heating a toner image formed on a sheet, the heating apparatus comprising:
- a rotary member configured to rotate while coming into contact with the sheet conveyed in a sheet conveyance direction, the rotary member having flexibility and being formed into a tubular shape;
- a heater configured to heat the rotary member; and
- a holding unit configured to hold a first end portion, in a longitudinal direction, of the rotary member,
- wherein the holding unit includes:
  - a movable member including a first surface configured to face and come into contact with an inner circumferential surface of the rotary member, and a second surface configured to face and come into contact with an end face, in the longitudinal direction, of the rotary member, the first surface and the second surface are integrally provided in the movable member; and
  - a holding member configured to hold tiltably around a tilting fulcrum, and
- wherein the tilting fulcrum is positioned between an upstream end and a downstream end of the first surface in the sheet conveyance direction, and is positioned closer to a center portion of the rotary member than the second surface is in the longitudinal direction.

2. The heating apparatus according to claim 1, wherein the movable member is tilted around the tilting fulcrum in a case where at least one of the first surface and the second surface receives a force from the rotary member.

3. The heating apparatus according to claim 1, wherein the movable member is tilted around the tilting fulcrum so as to align with the inner circumferential surface and the end face of the rotary member.

4. The heating apparatus according to claim 1, wherein the tilting fulcrum is positioned so as to overlap the first surface when viewed in an orthogonal direction orthogonal to the longitudinal direction and the sheet conveyance direction.

5. The heating apparatus according to claim 1, wherein either one of the movable member and the holding member includes a shaft portion extending in an orthogonal direction orthogonal to the longitudinal direction and the sheet conveyance direction,
- wherein the other one of the movable member and the holding member includes a hole portion configured to extend in the orthogonal direction and engage with the shaft portion, and
- wherein the tilting fulcrum is an axis passing through centers of the shaft portion and the hole portion and extending in the orthogonal direction.

6. The heating apparatus according to claim 1, wherein either one the movable member and the holding member includes a spherical portion formed into a spherical shape,
- wherein the other one of the movable member and the holding member includes an engaged portion configured to engage with the spherical portion, and
- wherein the tilting fulcrum is a center of the spherical portion.

7. The heating apparatus according to claim 1, further comprising a at least one projection that regulates detachment of the movable member from the holding member in a state in which the movable member is held by the holding member.

8. A fixing unit comprising:

the heating apparatus according to claim 1; and a press roller configured to form a fixing nip portion with the rotary member by coming into contact with an outer circumferential surface of the rotary member, the fixing nip portion fixing the toner image on the sheet.

9. The fixing unit according to claim 8, wherein the rotary member is a film, wherein the heater is arranged in an inner space of the film, and configured to nip the film with the press roller, and wherein the toner image formed on the sheet is fixed on the sheet by being heated in the fixing nip portion via the film.

10. The fixing unit according to claim 8, further comprising a pressing mechanism configured to bring the rotary member into pressure contact with the press roller by urging the holding member toward the press roller.

11. An image forming apparatus comprising:

an image forming unit configured to form a toner image on a sheet; and the fixing unit according to claim 8, the fixing unit being configured to fix the toner image, formed on the sheet by the image forming unit, on the sheet.

* * * * *